(No Model.)

A. H. KIRKER.
CAR BRAKE.

No. 499,553. Patented June 13, 1893.

WITNESSES:
C. Neveux
C. Sedgwick

INVENTOR
A. H. Kirker
BY Munn & Co.
ATTORNEYS.

UNITED STATES PATENT OFFICE.

ADOLPHUS J. LANDRY, OF BOSTON, MASSACHUSETTS.

EYEGLASSES.

SPECIFICATION forming part of Letters Patent No. 499,554, dated June 13, 1893.

Application filed October 4, 1892. Serial No. 447,801. (No model.)

*To all whom it may concern:*

Be it known that I, ADOLPHUS J. LANDRY, of Boston, in the county of Suffolk and State of Massachusetts, have invented a new and useful Improvement in Eyeglasses, of which the following is a full, clear, and exact description.

This invention relates to that description of eyeglasses in which the frames are of a sliding bar construction subject to the control of a spring, whereby the lenses are made readily or automatically adjustable toward or from each other in a straight line or path.

The invention consists in a novel construction of eye or "nose" glass frames of this description, whereby strength and durability are combined with a more perfect or practical application of the principle upon which such frames work, substantially as hereinafter described and pointed out in the claim.

Reference is to be had to the accompanying drawings forming a part of this specification, in which similar letters of reference indicate corresponding parts in all the figures.

Figure 1:
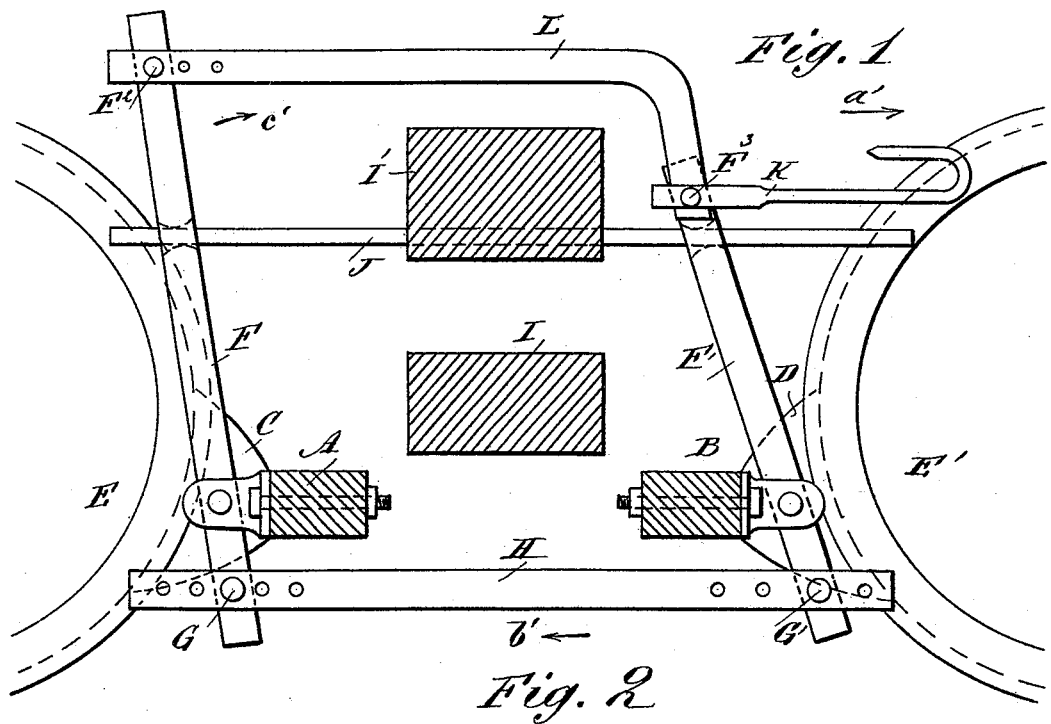
Figure 2:
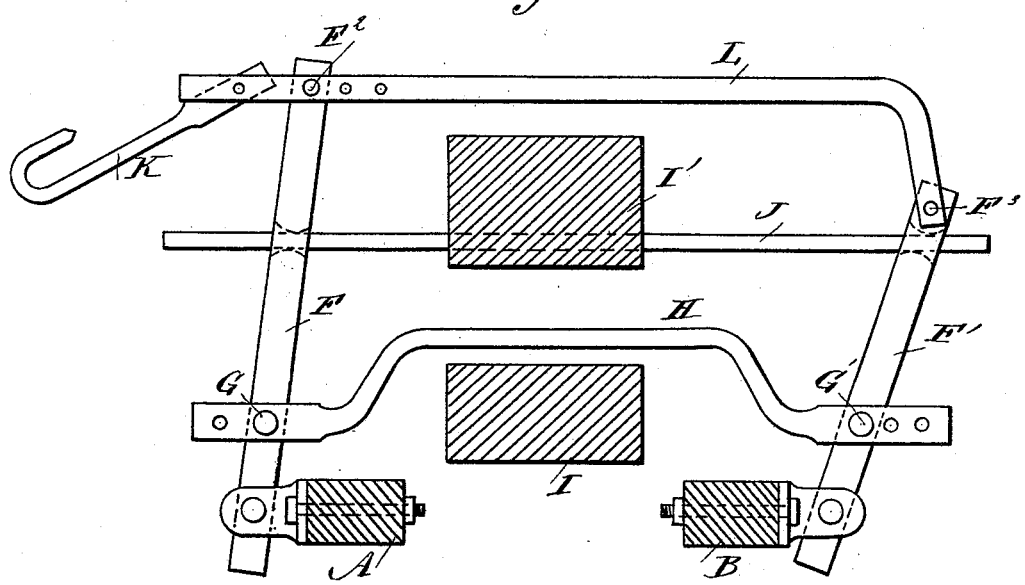

Figure 1 represents a pair of eyeglasses having a frame constructed in accordance with my invention; Fig. 2 a top or upper longitudinal edge view of the same; Fig. 3 a transverse section upon the line 3—3 in Fig. 1; and Fig. 4 is a section, in part, upon the line 4—4 in Fig. 1.

A A indicate the lenses and B B the lens frames or holders.

C C are the nose pieces or clamps.

Small straight bars $b\ b$, projecting inward, are made rigid and fast to the top of the lens holders B B. These bars lie in the same line or plane and face each other, and are solidly connected at their inwardly facing and projecting ends to small steel or other metal cross-heads or pieces $c\ c$ and braces $d\ d$ connecting the latter with the lens frames or holders B B. These small cross-heads or pieces $c\ c$ have each four holes made in or through them. Two of these holes are to provide for the attachment of the bars $b$ and and braces $d$, and the other two holes are for two parallel rods or bars $e\ e$ on opposite sides of the axial line of the bars $b\ b$, to pass freely through. Said rods $e\ e$ extend from lens holder to lens holder but are detached therefrom and are rigidly connected together at their inward or opposite ends by small guides or pieces $f\ f$ each of which has a hole in it for receiving each bar $b$ freely through it and to permit of said guides $f\ f$ sliding on or along the bars $b\ b$ or the bars through them, and the rods $e\ e$ are free to slide through the holes provided for them in the small cross-heads or pieces $c\ c$. Spiral springs $g\ g$ are wound around the rods $e\ e$ and connected or made fast at their opposite ends to the small cross-heads or pieces $c\ c$. These springs operate to draw the lens frames or holders B B together and to cause the clamps C C to grip the nose, but the lens holders are adjustable away from each other against the tension of the springs, and in the movement or drawing of the lens holders apart the bars $b\ b$ slide through the guides $f\ f$, and the latter slide on or along the bars $b\ b$. In this way or by these means a very steady action is secured for an adjusting double eyeglass frame of the character referred to, much more so than where a single spring with sliding bars to suit are used or different combination and arrangement of bars are employed, and greater strength and durability are obtained.

Having thus described my invention, what I claim as new, and desire to secure by Letters Patent, is—

In sliding bar eye-glass frames, the combination of the lens holders or frames B B, the upper straight bars $b\ b$ fast on said holders and projecting inward or toward and opposite each other, the perforated cross-heads or pieces $c\ c$ fast to the inner ends of said bars, the braces $d\ d$ connecting said cross-heads with the lens holders, the parallel rods $e\ e$, on opposite sides of said bars, the perforated guides $f\ f$ connecting said rods together at their opposite ends, and through which the bars $b\ b$ are free to slide while the cross-heads $c\ c$ are free to slide on the parallel rods $e, e$, and the springs $g\ g$ applied to said rods and connected at their opposite ends to the cross heads, essentially as shown and described.

ADOLPHUS J. LANDRY.

Witnesses:
ISAAC WASHBURN,
CLARENCE BURGIN.